United States Patent
Wang et al.

(10) Patent No.: US 11,397,357 B2
(45) Date of Patent: Jul. 26, 2022

(54) DIMMING PANEL AND MANUFACTURING METHOD THEREOF

(71) Applicants: Beijing BOE Optoelectronics Technology Co., Ltd., Beijing (CN); BOE TECHNOLOGY GROUP CO., LTD., Beijing (CN)

(72) Inventors: Jiaxing Wang, Beijing (CN); Hongliang Yuan, Beijing (CN); Xiaojuan Wu, Beijing (CN); Qi Zheng, Beijing (CN); Yao Bi, Beijing (CN); Zhiqiang Zhao, Beijing (CN); Xuan Zhong, Beijing (CN); Zhangxiang Cheng, Beijing (CN); Donghua Zhang, Beijing (CN); Ce Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/290,301

(22) PCT Filed: Jan. 12, 2021

(86) PCT No.: PCT/CN2021/071223
§ 371 (c)(1),
(2) Date: Apr. 30, 2021

(87) PCT Pub. No.: WO2021/147703
PCT Pub. Date: Jul. 29, 2021

(65) Prior Publication Data
US 2022/0043313 A1 Feb. 10, 2022

(30) Foreign Application Priority Data
Jan. 22, 2020 (CN) .......................... 202010075971.8

(51) Int. Cl.
G02F 1/1343 (2006.01)
G02F 1/1339 (2006.01)
G02F 1/1345 (2006.01)

(52) U.S. Cl.
CPC ...... *G02F 1/134309* (2013.01); *G02F 1/1339* (2013.01); *G02F 1/13439* (2013.01); *G02F 1/13452* (2013.01)

(58) Field of Classification Search
CPC ............. G02F 1/134309; G02F 1/1339; G02F 1/13439; G02F 1/13452; G02F 1/133601;
(Continued)

(56) References Cited

U.S. PATENT DOCUMENTS 8,988,649 B2   3/2015  Jeong et al.
9,075,242 B2   7/2015  Jeong et al.
(Continued)

FOREIGN PATENT DOCUMENTS

CN    102193202 A     9/2011
CN    103353693 A    10/2013
(Continued)

OTHER PUBLICATIONS

CN 203433240 U (Liu, Mei-hong et al.) and translation (Year: 2014).*

*Primary Examiner* — James A Dudek
(74) *Attorney, Agent, or Firm* — Westman, Champlin & Koehler, P.A.

(57) ABSTRACT

A dimming panel and a manufacturing method thereof are provided. The dimming panel includes: a first base substrate and a second base substrate opposite to the first substrate; a first electrode on the first base substrate; a second electrode on the second base substrate; and a liquid crystal layer between the first and second base substrate. The first electrode includes a plurality of first electrode strips arranged at
(Continued)

intervals in a first direction and a plurality of second electrode strips arranged at intervals in the first direction, the plurality of first electrode strips are located in a first electrode layer, the plurality of second electrode strips are located in a second electrode layer on a side of the first electrode layer away from the first base substrate. An orthographic projection of a combination of first and second electrode strips on the first base substrate is an integrated plane without gaps.

19 Claims, 9 Drawing Sheets

(58) Field of Classification Search
CPC ............. G02F 1/133606; G02F 1/1334; G02F 1/13342; G02F 1/13345; G02F 1/13347
USPC .......................................................... 349/15
See application file for complete search history.

(56) References Cited

U.S. PATENT DOCUMENTS

| 9,354,451 | B2 | 5/2016 | Jeong et al. | |
| 2010/0110316 | A1* | 5/2010 | Huang | H04N 13/359 |
| | | | | 349/15 |
| 2011/0228181 | A1 | 9/2011 | Jeong et al. | |
| 2014/0267961 | A1 | 9/2014 | Jeong et al. | |
| 2015/0261001 | A1 | 9/2015 | Jeong et al. | |

FOREIGN PATENT DOCUMENTS

| CN | 103995402 A | 8/2014 |
| CN | 107085327 A | 8/2017 |
| CN | 207352315 U | 5/2018 |
| CN | 109298571 A | 2/2019 |
| CN | 211149139 U | 7/2020 |
| JP | 2000172437 A | 6/2000 |

* cited by examiner

DIMMING PANEL AND MANUFACTURING METHOD THEREOF

CROSS REFERENCE TO RELATED APPLICATION(S)

This application is a Section 371 National Stage Application of International Application No. PCT/CN2021/071223, filed on Jan. 12, 2021, entitled "DIMMING PANEL AND MANUFACTURING METHOD THEREOF", which claims priority to the Chinese Patent Application No. 202010075971.8 filed on Jan. 22, 2020, the disclosures of which are incorporated herein by reference in their entireties.

TECHNICAL FIELD

The present disclosure relates to a field of display technology, and in particular to a dimming panel and a manufacturing method thereof.

BACKGROUND

At present, dimming panels are more and more widely used in fields of construction, transportation and interior decoration design. With the help of electric control, temperature control, light control or voltage control, the dimming panel may switch between a bright state and a dark state (or a fog state). For example, dimming panels include polymer dispersed liquid crystal (abbreviated as PDLC) dimming panels, electrochromic dimming panels and dye liquid crystal dimming panels. For various types of dimming panels, how to improve a display effect in the bright state and the dark state (or the fog state) to enhance an overall display impression of the dimming panel is a topic of continuous concern for developers.

SUMMARY

In order to solve at least one aspect of the problems described above, the embodiments of the present disclosure provide a dimming panel and a manufacturing method thereof.

In one aspect, there is provided a dimming panel, including: a first base substrate and a second base substrate opposite to the first base substrate; a first electrode on the first base substrate; a second electrode on the second base substrate; and a liquid crystal layer between the first base substrate and the second base substrate, wherein the first electrode includes a plurality of first electrode strips arranged at intervals in a first direction and a plurality of second electrode strips arranged at intervals in the first direction, the plurality of first electrode strips are located in a first electrode layer, the plurality of second electrode strips are located in a second electrode layer that is located on a side of the first electrode layer away from the first base substrate, and an orthographic projection of a combination of the plurality of first electrode strips and the plurality of second electrode strips on the first base substrate is an integrated plane without gaps.

According to some exemplary embodiments, the first electrode layer further includes a plurality of first gaps, the plurality of first electrode strips and the plurality of first gaps are alternately arranged in the first direction, and orthographic projections of the plurality of second electrode strips on the first base substrate cover orthographic projections of the plurality of first gaps on the first base substrate, respectively; and/or the second electrode layer further includes a plurality of second gaps, the plurality of second electrode strips and the plurality of second gaps are alternately arranged in the first direction, and orthographic projections of the plurality of first electrode strips on the first base substrate cover orthographic projections of the plurality of second gaps on the first base substrate, respectively.

According to some exemplary embodiments, areas of the orthographic projections of the plurality of second electrode strips on the first base substrate are equal to areas of the orthographic projections of the plurality of first gaps on the first base substrate, respectively; and/or areas of the orthographic projections of the plurality of first electrode strips on the first base substrate are equal to areas of the orthographic projections of the plurality of second gaps on the first base substrate, respectively.

According to some exemplary embodiments, areas of the orthographic projections of the plurality of second electrode strips on the first base substrate are greater than areas of the orthographic projections of the plurality of first gaps on the first base substrate, respectively; and/or areas of the orthographic projections of the plurality of first electrode strips on the first base substrate are greater than areas of the orthographic projections of the plurality of second gaps on the first base substrate, respectively.

According to some exemplary embodiments, an orthographic projection of an edge portion of the first electrode strip close to the second electrode strip on the first base substrate has an overlapping area with an orthographic projection of an edge portion of the second electrode strip close to the first electrode strip on the first base substrate in the first direction.

According to some exemplary embodiments, a size of the overlapping area in the first direction is one-tenth to one-third of a size of one of the first electrode strip and the second electrode strip in the first direction.

According to some exemplary embodiments, the dimming panel further includes: a frame sealant arranged between the first base substrate and the second base substrate; and a conductive structure arranged on the first base substrate, wherein the frame sealant is doped with conductive particles, and the conductive structure is electrically connected to the second electrode through the conductive particles.

According to some exemplary embodiments, an orthographic projection of the conductive structure on the first base substrate is an inverted-U shape.

According to some exemplary embodiments, the dimming panel further includes: a plurality of wires arranged on the first base substrate; and a driving circuit arranged on the first base substrate, wherein the plurality of wires include a plurality of first wires for electrically connecting the plurality of first electrode strips and the plurality of second electrode strips to the driving circuit.

According to some exemplary embodiments, the plurality of wires further include at least one second wire for electrically connecting the conductive structure to the driving circuit.

According to some exemplary embodiments, the dimming panel further includes: a first insulating layer arranged between the first electrode layer and the second electrode layer; and a second insulating layer arranged on a side of the second electrode layer away from the first base substrate.

According to some exemplary embodiments, the dimming panel further includes a third insulating layer arranged on the first base substrate, and the third insulating layer is filled between the plurality of wires and covers the plurality of wires.

According to some exemplary embodiments, the second electrode is a planar electrode, and an orthographic projection of the second electrode on the first base substrate covers the orthographic projection of the combination of the plurality of first electrode strips and the plurality of second electrode strips on the first base substrate.

According to some exemplary embodiments, the orthographic projection of the combination of the plurality of first electrode strips and the plurality of second electrode strips on the first base substrate does not overlap an orthographic projection of the frame sealant on the first base substrate and does not overlap an orthographic projection of the conductive structure on the first base substrate.

According to some exemplary embodiments, the dimming panel further includes a passivation layer arranged on the second base substrate, the second electrode is located on a side of the passivation layer away from the second base substrate, the passivation layer includes a plurality of strip-shaped passivation portions arranged at intervals in the first direction, and an orthographic projection of the plurality of strip-shaped passivation portions on the first base substrate overlaps an orthographic projection of the plurality of first electrode strips on the first base substrate.

According to some exemplary embodiments, the second electrode includes a plurality of first electrode portions and a plurality of second electrode portions that are alternately arranged in the first direction, an orthographic projection of the plurality of first electrode portions on the first base substrate overlaps the orthographic projection of the plurality of first electrode strips on the first base substrate, and an orthographic projection of the plurality of second electrode portions on the first base substrate overlaps the orthographic projection of the plurality of second electrode strips on the first base substrate.

According to some exemplary embodiments, a size of the strip-shaped passivation portion in a direction perpendicular to the first base substrate is equal to a size of the first electrode strip in the direction perpendicular to the first base substrate.

In another aspect, there is provided a method of manufacturing a dimming panel, including: forming a plurality of first electrode strips arranged at intervals on a first base substrate; forming a plurality of second electrode strips arranged at intervals on a side of a layer where the plurality of first electrode strips are located away from the first base substrate; forming a second electrode on a second base substrate; forming a liquid crystal layer on one of the first base substrate and the second base substrate; and aligning and assembling the first base substrate with the second base substrate to form the dimming panel, wherein an orthographic projection of a combination of the plurality of first electrode strips and the plurality of second electrode strips on the first base substrate is an integrated plane without gaps.

BRIEF DESCRIPTION OF THE DRAWINGS

With the following description of the present disclosure with reference to the drawings, other objectives and advantages of the present disclosure would be obvious and the present disclosure would be understood comprehensively.

Figure 1:
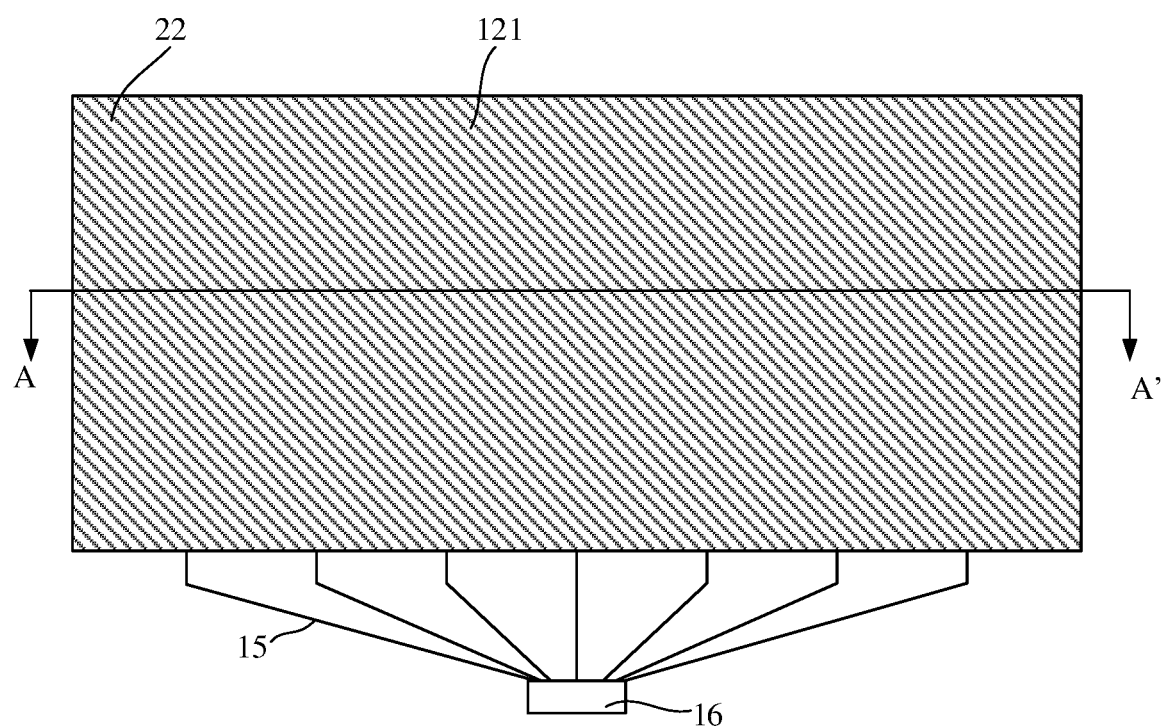
FIG. 1 shows a schematic plan view of a dimming panel according to some exemplary embodiments of the present disclosure.

It should be noted that for the sake of clarity, in the drawings used to describe the embodiments of the present disclosure, sizes of layers, structures or areas may be enlarged or reduced, that is, these drawings are not drawn according to actual scale.

DETAILED DESCRIPTION OF EMBODIMENTS

The technical solutions of the present disclosure will be further described in detail below through the embodiments and in conjunction with the drawings. In the specification, the same or similar reference numerals indicate the same or similar components. The following description of the embodiments of the present disclosure with reference to the drawings is intended to explain the general inventive concept of the present disclosure, and should not be understood as a limitation of the present disclosure.

In addition, in the following detailed description, for ease of explanation, many specific details are set forth to provide a comprehensive understanding of the embodiments of the present disclosure. Obviously, however, one or more embodiments may also be implemented without these specific details.

It should be understood that, although the terms "first," "second" and so on may be used herein to describe different elements, these elements should not be limited by these terms. These terms are only used to distinguish one element from another. For example, without departing from the scope of the exemplary embodiments, a first element may be named as a second element, and similarly, the second element may be named as the first element. The term "and/or" as used here includes any and all combinations of one or more related listed items.

It should be understood that when an element or layer is referred to as being "formed on" another element or layer, the element or layer may be directly or indirectly formed on the other element or layer. That is, for example, an intermediate element or an intermediate layer may be present. In contrast, when an element or layer is referred to as being "directly formed on" another element or layer, no intermediate elements or layers are present. Other terms used to describe the relationship between elements or layers (for example, "between" and "directly between", "adjacent to" and "directly adjacent to", etc.) should be interpreted in a similar manner.

The terms used herein are only for the purpose of describing specific embodiments, and are not intended to limit the exemplary embodiments. As used herein, unless otherwise specified in the context, a singular form is also intended to include a plural form. It should also be understood that when the terms "comprising" and/or "including" are used herein, it means that the described features, wholes, steps, operations, elements and/or components are present, but do not exclude the presence or addition of one or more other features, wholes, steps, operations, elements, components and/or combinations thereof.

In the present disclosure, unless otherwise specified, the expression "thickness" refers to a dimension of a layer or component in a direction perpendicular to an upper surface of a substrate (in the use state, the upper surface of the substrate is a surface facing a user).

Figure 2:
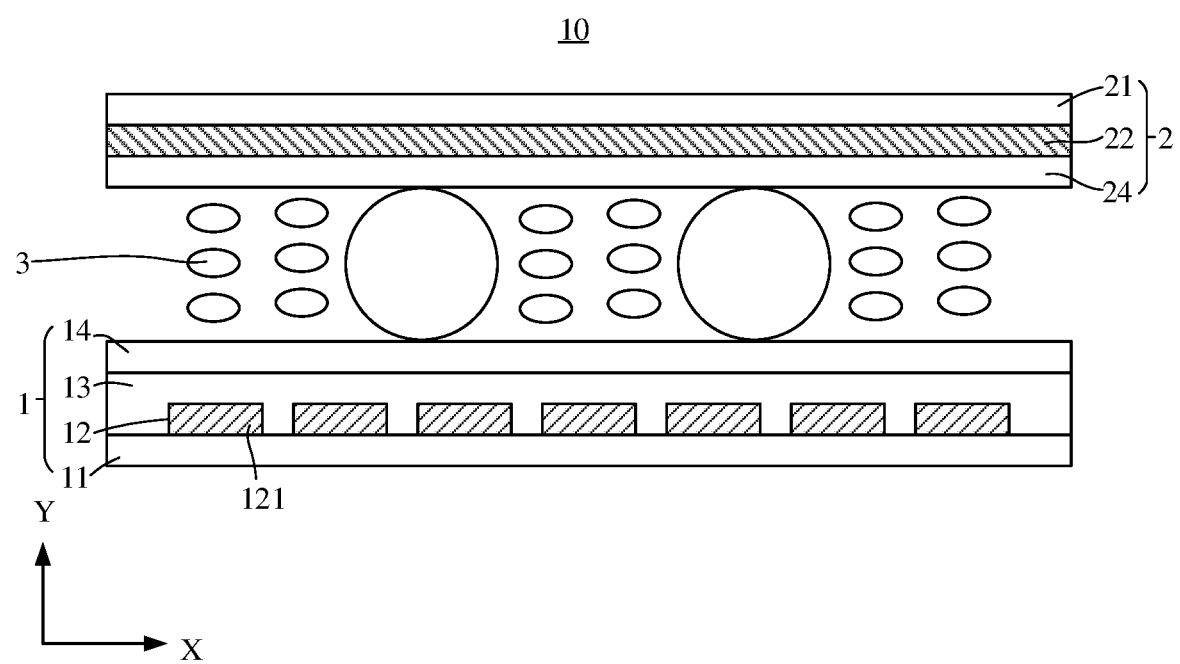
FIG. 2 shows a cross-sectional view of the dimming panel according to some exemplary embodiments of the present disclosure taken along line AA' in FIG. 1.

FIG. 1 shows a schematic plan view of a dimming panel according to some exemplary embodiments of the present disclosure. FIG. 2 shows a cross-sectional view of the dimming panel according to some exemplary embodiments of the present disclosure, taken along line AA' in FIG. 1.

Referring to FIG. 1 and FIG. 2, a dimming panel 10 may include a first dimming substrate 1 and a second dimming substrate 2 opposite to the first dimming substrate, and a liquid crystal layer 3 interposed between the first dimming substrate 1 and the second dimming substrate 2.

The first dimming substrate 1 may include a first base substrate 11, a first electrode 12, a first insulating layer 13 and a first alignment layer 14. The first electrode 12, the first insulating layer 13 and the first alignment layer 14 are sequentially arranged on the first base substrate 11.

The second dimming substrate 2 may include a second base substrate 21, a second electrode 22 and a second alignment layer 24. The second electrode 22 and the second alignment layer 24 are sequentially arranged on the second base substrate 21.

For example, the first base substrate 11 and the second base substrate 21 may be transparent glass substrates. In this case, the dimming panel 10 may also be referred to as dimming glass. For example, the dimming panel 10 may be applied to fields such as construction, transportation and interior decoration design, to switch between a transparent state and a non-transparent state (for example, a dark state or a fog state).

For example, the first electrode 12 and the second electrode 22 may be transparent electrodes, for example, made of a transparent conductive material such as indium tin oxide (ITO).

In some embodiments of the present disclosure, the liquid crystal layer 3 may contain dye liquid crystals. Specifically, the liquid crystal layer 3 may contain liquid crystal molecules and chromatic dye molecules mixed with the liquid crystal molecules. For example, the chromatic dye molecules may be dichroic dye molecules.

In the dimming panel provided by the embodiments of the present disclosure, when no voltage is applied to the first electrode 12 and the second electrode 22, no electric field is generated between the first electrode 12 and the second electrode 22, and the liquid crystal molecules and the chromatic dye molecules in the liquid crystal layer 3 are aligned vertically and do not absorb light, so that the dimming panel presents a light-transmitting state (that is, the transparent state). When a predetermined voltage is applied to the first electrode 12 and the second electrode 22, an electric field is generated between the first electrode 12 and the second electrode 22, the liquid crystal molecules and the chromatic dye molecules in the liquid crystal layer 3 are deflected, and the liquid crystal molecules are arranged horizontally under the action of the electric field, which induce a horizontal arrangement of the chromatic dye molecules to absorb light, so that the dimming panel presents an opaque state (that is, the dark state).

In the embodiments described above, the dye liquid crystal is illustrated by way of example in describing the dimming panel provided in the embodiments of the present disclosure. It should be understood that the dimming panel provided in the embodiments of the present disclosure may also contain other types of liquid crystals, including but not limited to polymer dispersed liquid crystal (PDLC).

Figure 3:
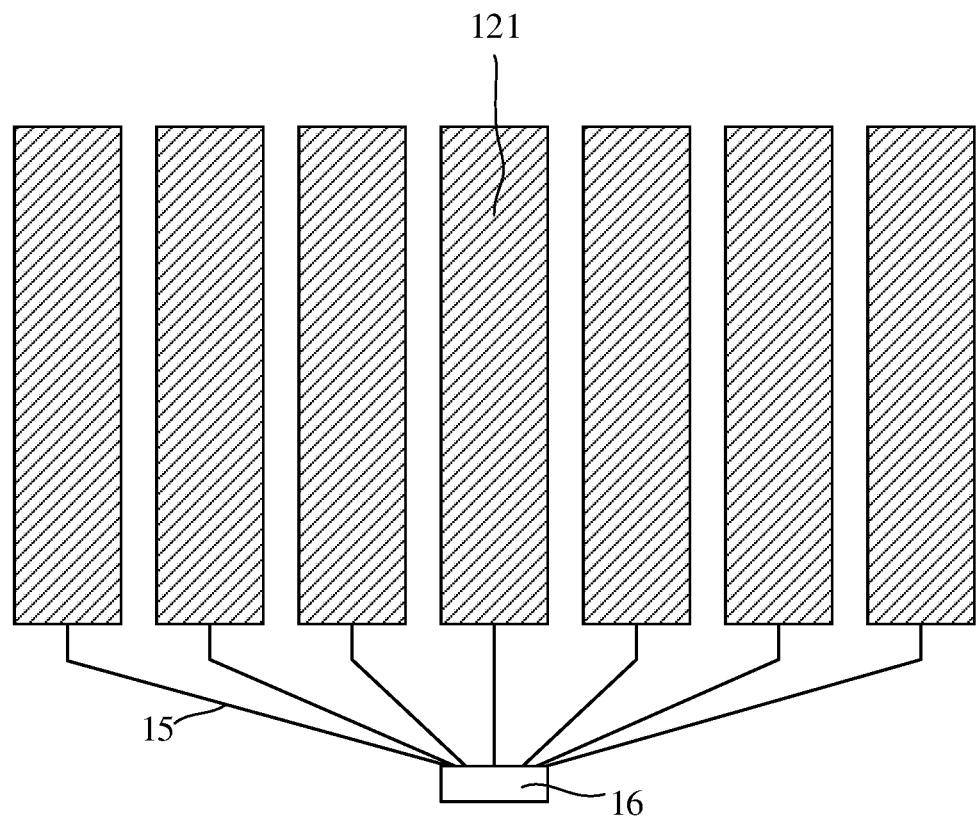
FIG. 3 and FIG. 4 respectively show schematic plan views of a first dimming substrate and a second dimming substrate of a dimming panel according to the embodiments of the present disclosure.
Figure 4:
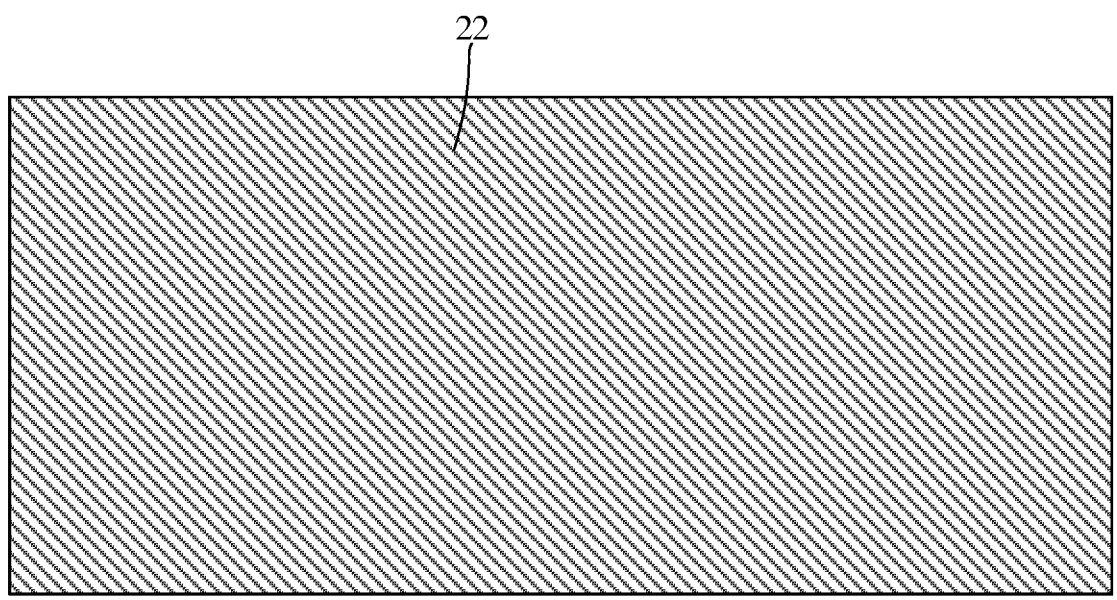

FIG. 3 and FIG. 4 respectively show schematic plan views of the first dimming substrate and the second dimming substrate of the dimming panel according to the embodiments of the present disclosure.

Referring to FIG. 1 to FIG. 4, the first electrode 12 of the first dimming substrate 1 includes a plurality of electrode strips 121 arranged at intervals on the first base substrate 11. That is, an orthographic projection of the first electrode 12 on the first base substrate 11 is formed into a plurality of strip shapes distributed at intervals. It should be understood that each electrode strip 121 is a transparent electrode strip, for example, made of a transparent conductive material such as ITO.

Referring to FIG. 1 and FIG. 3, the dimming panel 10 may further include a plurality of wires 15 arranged on the first base substrate 11. Exemplarily, the plurality of wires 15 may be in one-to-one correspondence with the plurality of electrode strips 121. For example, each wire 15 may be a conductive wire made of a conductive material.

Referring to FIG. 1 and FIG. 3, the dimming panel 10 may further include a driving circuit 16 such as an IC, for providing a control signal (such as a voltage signal). Specifically, the plurality of wires 15 may electrically connect the corresponding electrode strips 121 to the driving circuit 16 such as the IC, so that the control signal provided by the driving circuit 16 may be supplied to the plurality of electrode strips 121.

The second electrode 22 of the second dimming substrate 2 may be a planar electrode. That is, an orthographic projection of the second electrode 22 on the second base substrate 21 is formed into a continuous planar pattern. For example, in the embodiment of FIG. 4, the orthographic projection of the second electrode 22 on the second base substrate 21 is formed as a complete rectangle.

Exemplarily, as shown in FIG. 1, the orthographic projection of the first electrode 12 on the first base substrate 11 falls within the orthographic projection of the second electrode 22 on the first base substrate 11.

It should be understood that the second electrode 22 may also be electrically connected to the driving circuit 16 such as the IC through a conductive structure (to be described in detail below), so that the control signal provided by the driving circuit 16 may be supplied to the second electrode 22.

In the dimming panel provided by the embodiments of the present disclosure, the driving circuit 16 may supply a first control signal to one or more of the plurality of electrode strips 121 and supply a second control signal to the second electrode 22 so as to generate an electric field between one or more of the plurality of electrode strips 121 and the second electrode 22, so that a portion corresponding to the one or more electrode strips 121 supplied with the first control signal is in the non-transparent state, and the other portion of the dimming panel is in the transparent state. In this way, when the dimming panel is used as dimming glass, a display effect similar to "blinds" may be produced.

Figure 5:
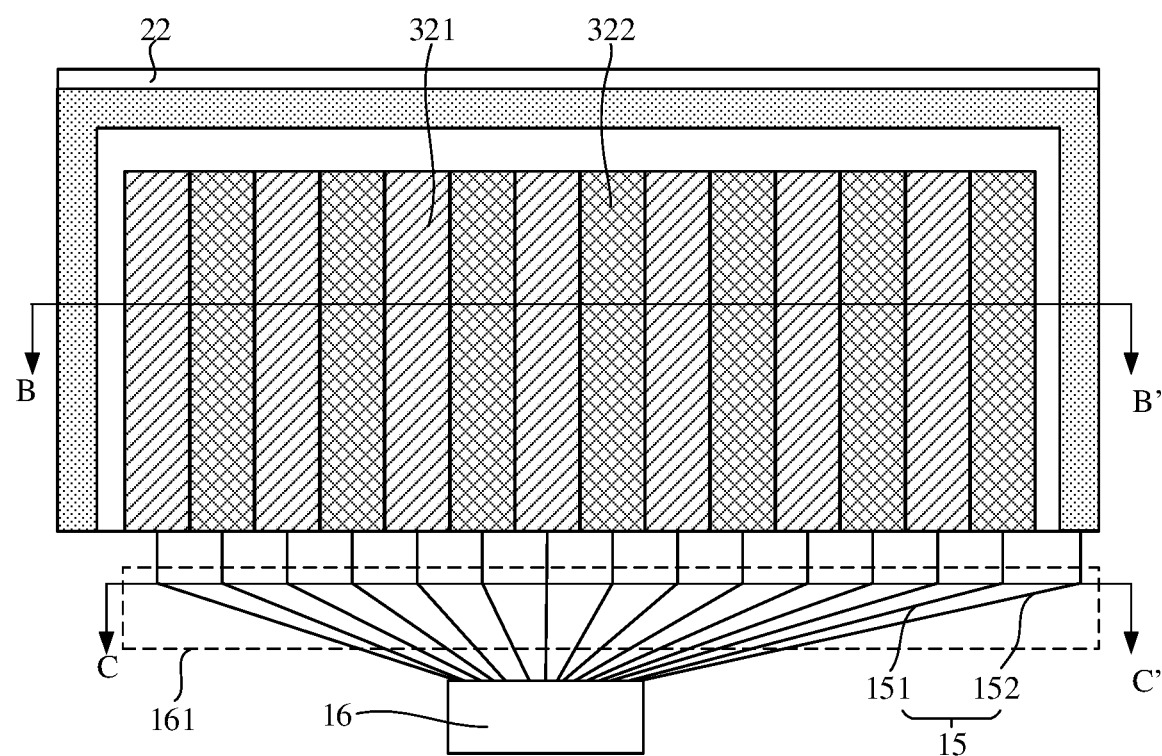
FIG. 5 shows a schematic plan view of a dimming panel according to some exemplary embodiments of the present disclosure.
Figure 6:
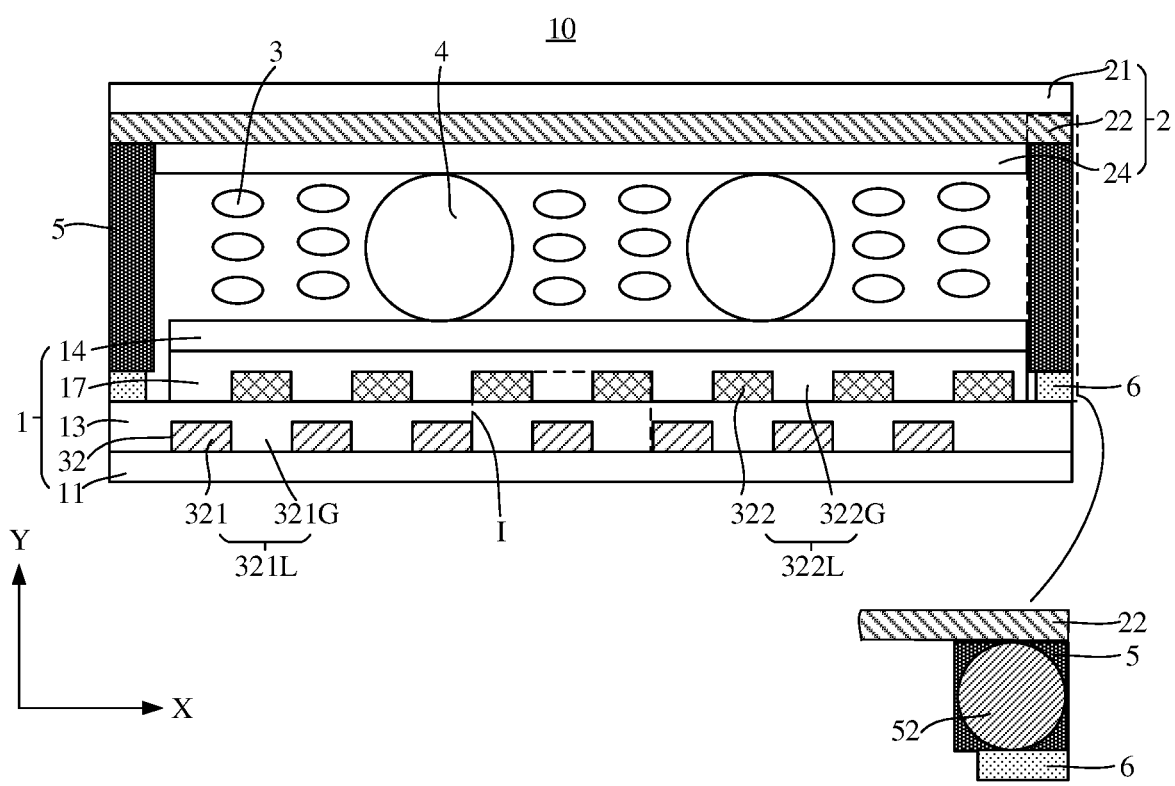
FIG. 6 shows a cross-sectional view of the dimming panel according to some exemplary embodiments of the present disclosure taken along line BB' in FIG. 5.

FIG. 5 shows a schematic plan view of the dimming panel according to some exemplary embodiments of the present disclosure. FIG. 6 shows a cross-sectional view of the dimming panel according to some exemplary embodiments of the present disclosure, taken along line BB' in FIG. 5. It should be noted that some structures of the embodiments shown in FIG. 5 to FIG. 6 may be referred to the above description of FIG. 1 to FIG. 4, and the same or similar components or structures are indicated by the same reference numerals.

Referring to FIG. 5 and FIG. 6, the dimming panel 10 may include a first dimming substrate 1 and a second dimming substrate 2 opposite to the first dimming substrate, and a liquid crystal layer 3 interposed between the first dimming substrate 1 and the second dimming substrate 2.

The first dimming substrate 1 may include a first base substrate 11, a first electrode 32, a first insulating layer 13, a second insulating layer 17 and a first alignment layer 14.

The second dimming substrate 2 may include a second base substrate 21, a second electrode 22 and a second alignment layer 24. The second electrode 22 and the second alignment layer 24 are sequentially arranged on the second base substrate 21.

For example, the first electrode 32 and the second electrode 22 may be transparent electrodes, for example, made of a transparent conductive material such as indium tin oxide (ITO), zinc tin oxide (IZO), and the like.

Figure 7:
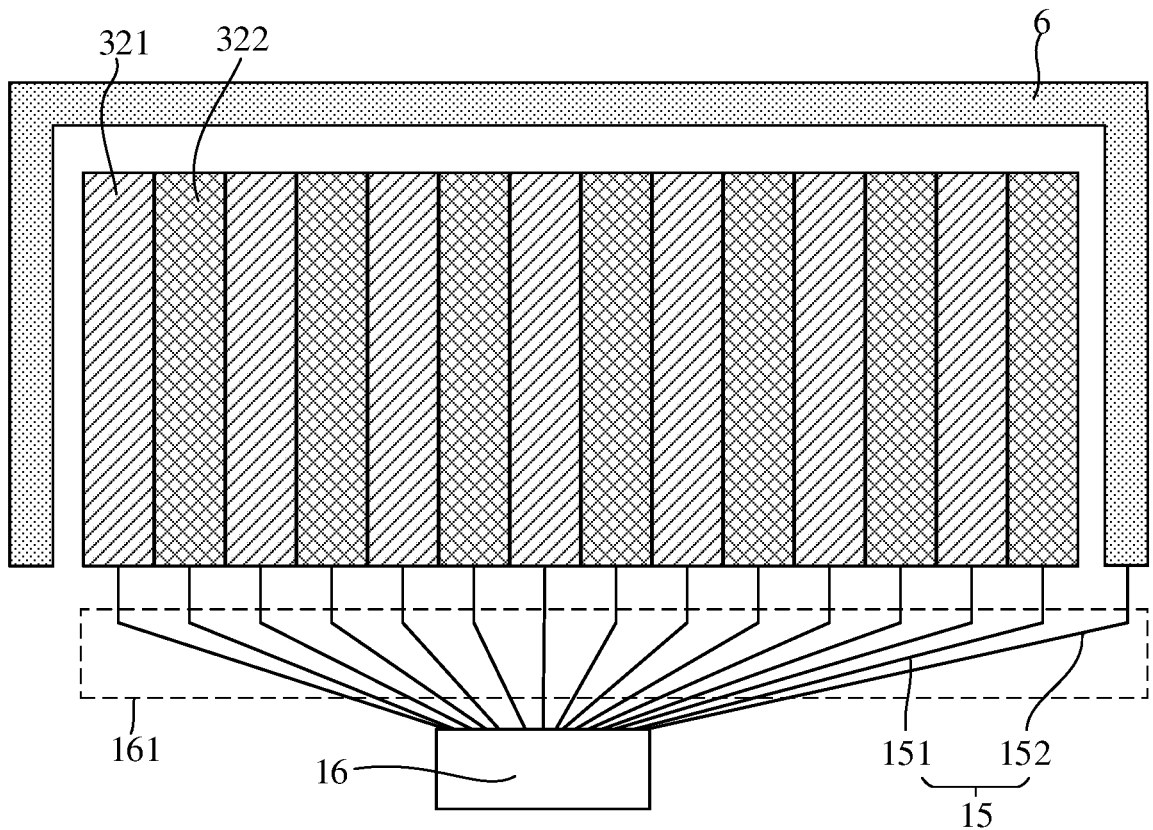
FIG. 7 and FIG. 8 respectively show schematic plan views of a first dimming substrate and a second dimming substrate of a dimming panel according to the embodiments of the present disclosure.
Figure 8:
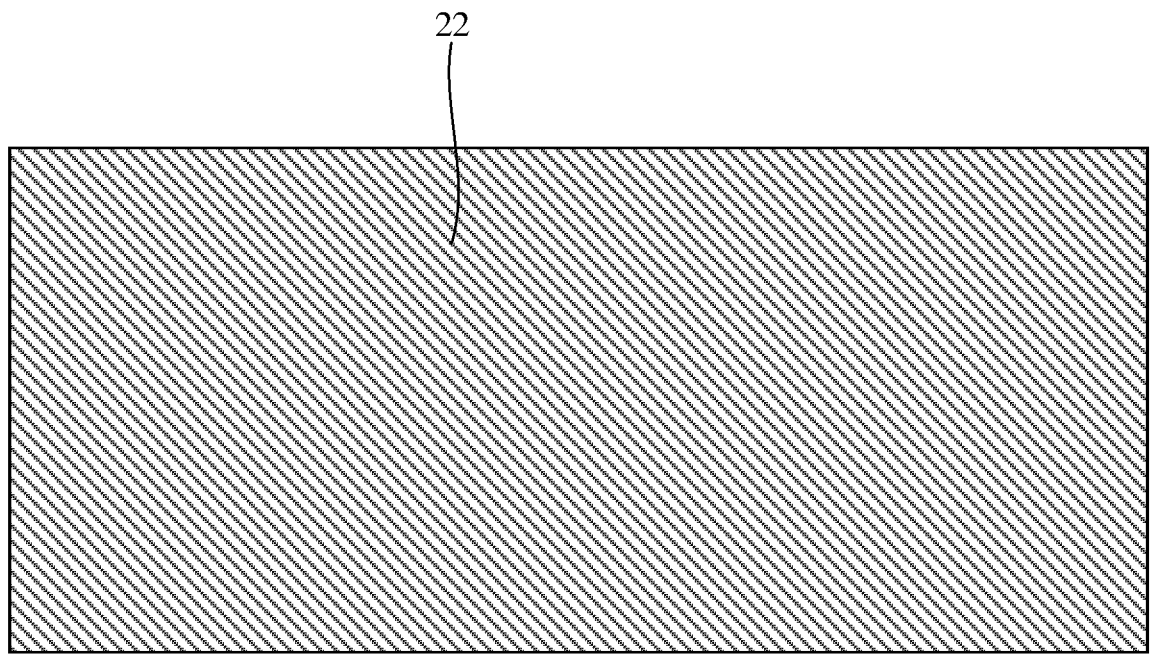

FIG. 7 and FIG. 8 respectively show schematic plan views of the first dimming substrate and the second dimming substrate of the dimming panel according to the embodiments of the present disclosure.

Referring to FIG. 5 to FIG. 8, the first electrode 32 of the first dimming substrate 1 includes a plurality of first electrode strips 321 and a plurality of second electrode strips 322. The plurality of first electrode strips 321 are located in the same layer, and the plurality of second electrode strips 322 are located in the same layer. For ease of description, the layer where the plurality of first electrode strips 321 are located is referred to as a first electrode layer 321L, and the layer where the plurality of second electrode stripes 322 are located is referred to as a second electrode layer 322L. Referring to FIG. 6, the first electrode layer 321L and the second electrode layer 322L are different layers and are separated by the first insulating layer 13. Specifically, the first electrode layer 321L is arranged on the first base substrate 11, the first insulating layer 13 is arranged on a side of the first electrode layer 321L away from the first base substrate 11, the second electrode layer 322L is arranged on a side of the first insulating layer 13 away from the first base substrate 11, and the second insulating layer 17 is arranged on a side of the second electrode layer 322L away from the first base substrate 11.

The first insulating layer 13 is arranged between the first electrode layer 321L and the second electrode layer 322L, and may play a role of planarization and insulation. For example, the first insulating layer 13 may be made of silicon nitride or silicon oxide or other transparent insulating materials.

The plurality of first electrode strips 321 located in the first electrode layer 321L are arranged in parallel and at intervals. That is, the first electrode layer 321L includes the plurality of first electrode strips 321 and a plurality of first gaps 321G respectively located between two adjacent first electrode strips 321. In this way, the plurality of first electrode strips 321 are electrically isolated from each other.

In the embodiment shown in FIG. 5 and FIG. 6, the plurality of first electrode strips 321 are arranged at intervals in a first direction (X direction shown), and each first electrode strip 321 extends in a second direction (a direction perpendicular to paper shown in FIG. 6). In the embodiment shown, the first direction and the second direction are perpendicular to each other.

The plurality of second electrode strips 322 located in the second electrode layer 322L are arranged in parallel and at intervals. That is, the second electrode layer 322L includes the plurality of second electrode strips 322 and a plurality of second gaps 322G respectively located between two adjacent second electrode strips 322. In this way, the plurality of second electrode strips 322 are electrically isolated from each other.

In the embodiment shown in FIG. 5 and FIG. 6, the plurality of second electrode strips 322 are arranged at intervals in the first direction (X direction shown), and each second electrode strip 322 extends in the second direction (the direction perpendicular to paper shown in FIG. 6).

In the embodiments of the present disclosure, the plurality of first electrode strips 321 and the plurality of second electrode strips 322 are formed to have a complementary relationship. That is, the orthographic projection of the combination of the plurality of first electrode strips 321 and the plurality of second electrode strips 322 on the first base substrate 11 forms an integrated plane without gaps. Here, the expression "an integrated plane without gaps" means that the orthographic projection of the combination of the plurality of first electrode strips 321 and the plurality of second electrode strips 322 on the first base substrate 11 includes no gaps, that is, it is seamless. In other words, the orthographic projection of the combination of the plurality of first electrode strips 321 and the plurality of second electrode strips 322 on the first base substrate 11 may completely cover the orthographic projection of the liquid crystal layer 3 interposed between the first electrode 32 and the second electrode 22 on the first base substrate 11.

Optionally, the plurality of first electrode strips 321 are in one-to-one correspondence with the plurality of second gaps 322G. An orthographic projection of each first electrode strip 321 on the first base substrate 11 coincides with an orthographic projection of the second gap 322G corresponding to the each first electrode strip 321 on the first base substrate 11. The plurality of second electrode strips 322 are in one-to-one correspondence with the plurality of first gaps 321G. An orthographic projection of each second electrode strip 322 on the first base substrate 11 coincides with an orthographic projection of the first gap 321G corresponding to the each second electrode strip 322 on the first base substrate 11.

In other words, a size of any one of the first electrode strips 321 in the first direction (the X direction in FIG. 6) is equal to a size of the corresponding second gap 322G in the first direction. For example, the each first electrode strip 321 has the same size in the first direction, which may be denoted as W1, each second gap 322G has the same size in the first direction, which may be denoted as W3, and in some exemplary embodiments, W1=W3. A size of any one of the second electrode strips 322 in the first direction is equal to a size of the corresponding first gap 321G in the first direction. For example, each second electrode strip 322 has the same size in the first direction, which may be denoted as W2, each first gap 321G has the same size in the first direction, which may be denoted as W4, and in some exemplary embodiments, W2=W4. For another example, the size of any one of the first electrode strips 321 in the first direction may be equal to the size of each second electrode strip 322 in the first direction, that is, W1=W2.

Figure 9:
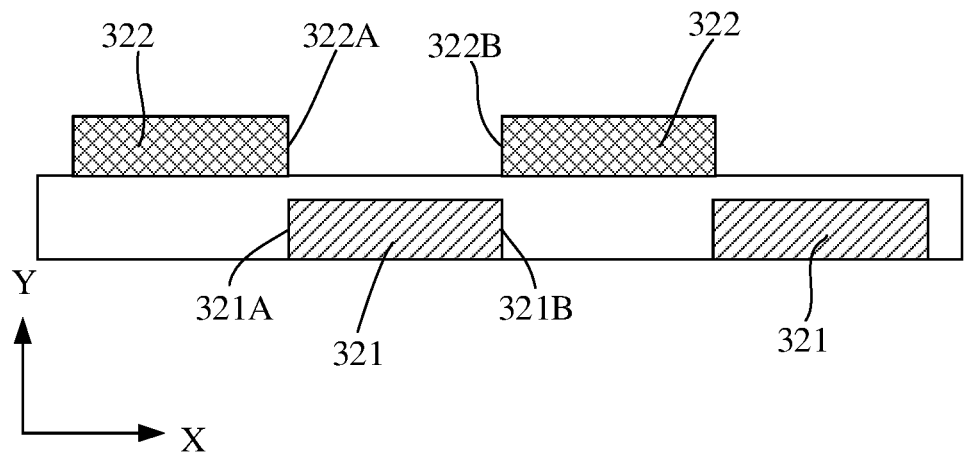
FIG. 9 shows a partial enlarged view of a dimming panel according to some exemplary embodiments of the present disclosure at part I of FIG. 6.

More specifically, a side surface of the first electrode strip 321 close to the second electrode strip 322 adjacent to the first electrode strip 321 coincides with a side surface of the second electrode strip 322 close to the first electrode strip 321 adjacent to the second electrode strip 322. For example, as shown in FIG. 9, the first electrode strip 321 has a first side surface 321A close to a second electrode strip 322 and a second side surface 321B close to another second electrode strip 322. The second electrode strip 322 adjacent to the first electrode strip 321 has a third side surface 322A close to the first electrode strip 321, and the other second electrode strip 322 adjacent to the first electrode strip 321 has a fourth side surface 322B close to the first electrode strip 321. The first side surface 321A is aligned with the third side surface 322A, and the second side surface 321B is aligned with the fourth side surface 322B. That is, an orthographic projection of the first side surface 321A on the first base substrate 11 coincides with an orthographic projection of the third side surface 322A on the first base substrate 11, and an orthographic projection of the second side surface 321B on the first base substrate 11 coincides with an orthographic projection of the fourth side surface 322B on the first base substrate 11.

Referring to FIG. 5 and FIG. 7, the dimming panel 10 may further include a driving circuit 16 such as an IC for providing a control signal (such as a voltage signal). Specifically, the plurality of wires 15 may electrically connect the corresponding electrode strips 321, 322 to the driving circuit 16 such as the IC, so that the control signal provided by the driving circuit 16 may be supplied to the plurality of electrode strips 321, 322.

The second electrode 22 of the second dimming substrate 2 may be a planar electrode.

Exemplarily, as shown in FIG. 5, the orthographic projection of the first electrode 32 on the first base substrate 11 falls within the orthographic projection of the second electrode 22 on the first base substrate 11. That is, the orthographic projection of the combination of the first electrode strips 321 and the second electrode strips 322 on the first base substrate 11 falls within the orthographic projection of the second electrode 22 on the first base substrate 11.

It should be understood that the second electrode 22 may also be electrically connected to the driving circuit 16 such as the IC through a conductive structure (to be described in detail below), so that the control signal provided by the driving circuit 16 may be supplied to the second electrode 22.

In the dimming panel provided by the embodiments of the present disclosure, the driving circuit 16 may supply the first control signal to one or more of the plurality of electrode strips 321, 322, and supply the second control signal to the second electrode 22, so as to generate an electric field between one or more of the plurality of electrode strips 321, 322 and the second electrode 22, so that a portion corresponding to the one or more electrode strips 321, 322 supplied with the first control signal is in the non-transparent state, and the other portion of the dimming panel is in the transparent state. In this way, when the dimming panel is used as dimming glass, a display effect similar to "blinds" may be produced. Moreover, in the dimming panel provided by the embodiments of the present disclosure, there is no gap between the plurality of electrode strips of the first electrode, that is, the plurality of electrode strips are closely distributed. This ensures that the dimming panel does not leak light when it is in the non-transparent state, and the shape of the electrode strips is not displayed in the transparent state, so that the dimming panel as a whole has a uniform bright state effect on the entire surface. In this way, when the dimming panel is used as dimming glass, the overall impression of the dimming glass may be improved.

In addition, in the embodiments described above, the side surface of the first electrode strip 321 close to the second electrode strip 322 adjacent to the first electrode strip 321 coincides with the side surface of the second electrode strip 322 close to the first electrode strip 321 adjacent to the second electrode strip 322. In this way, an electric signal interference between the first electrode strip and the second electrode strip is reduced as much as possible, which is beneficial to cooperate with the second electrode to form an electric field.

Figure 10:
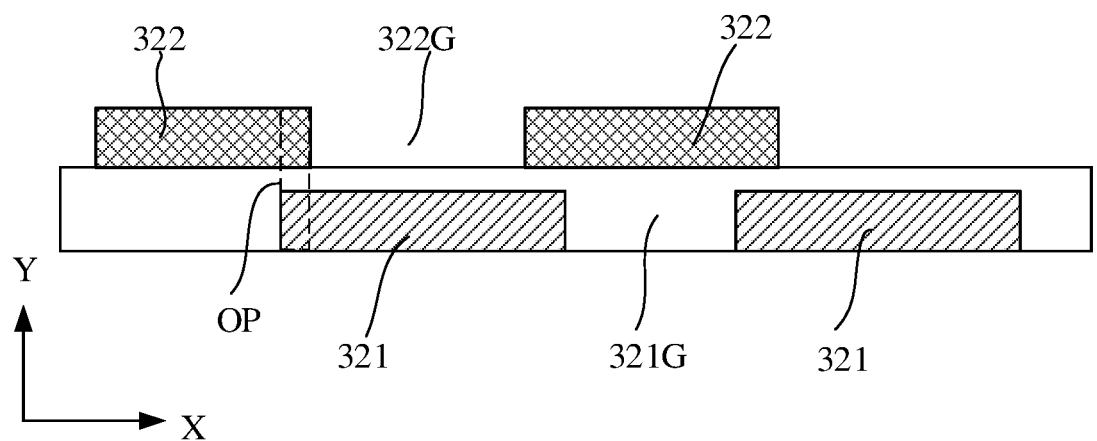
FIG. 10 shows a partial enlarged view of a dimming panel according to other exemplary embodiments of the present disclosure at part I of FIG. 6.

Optionally, in the embodiments of the present disclosure, referring to FIG. 10, an edge portion of the first electrode strip 321 close to the second electrode strip 322 adjacent to the first electrode strip 321 may overlap an edge portion of the second electrode strip 322 close to the first electrode strip 321 adjacent to the second electrode strip 322, that is, there is a certain overlapping area between the edge portion of the first electrode strip 321 and the edge portion of the second electrode strip 322.

With reference to FIG. 6 and FIG. 10, the plurality of first electrode strips 321 may be in one-to-one correspondence with the plurality of second gaps 322G. The orthographic projection of each first electrode strip 321 on the first base substrate 11 covers the orthographic projection of the second gap 322G corresponding to the each first electrode strip 321 on the first base substrate 11. That is, an area of the orthographic projection of the each first electrode strip 321 on the first base substrate 11 is greater than an area of the orthographic projection of the second gap 322G corresponding to the each first electrode strip 321 on the first base substrate 11. The plurality of second electrode strips 322 may be in one-to-one correspondence with the plurality of first gaps 321G. The orthographic projection of each second electrode strip 322 on the first base substrate 11 covers the orthographic projection of the first gap 321G corresponding to the each second electrode strip 322 on the first base substrate 11. That is, an area of the orthographic projection of the each second electrode strip 322 on the first base substrate 11 is greater than an area of the orthographic projection of the first gap 321G corresponding to the each second electrode strip 322 on the first base substrate 11.

In other words, the size of any one of the first electrode strips 321 in the first direction (the X direction in FIG. 10) is greater than the size of the corresponding second gap 322G in the first direction. For example, each first electrode strip 321 has the same size in the first direction, which may be denoted as W1, each second gap 322G has the same size in the first direction, which may be denoted as W3, and in some exemplary embodiments, W1>W3. The size of any one of the second electrode strips 322 in the first direction is greater than the size of the corresponding first gap 321G in the first direction. For example, each second electrode strip 322 has the same size in the first direction, which may be denoted as W2, each first gap 321G has the same size in the first direction, which may be denoted as W4, and in some exemplary embodiments, W2>W4. For another example, the size of any one of the first electrode strips 321 in the first direction may be equal to the size of the each second electrode strip 322 in the first direction, that is, W1=W2. The size of the each first gap 321G in the first direction is equal to the size of the each second gap 322G in the first direction, that is, W3=W4.

In this embodiment, the orthographic projection of the combination of the plurality of first electrode strips 321 and the plurality of second electrode strips 322 on the first base substrate 11 may still form an integrated plane. That is, the orthographic projection of the combination of the plurality of first electrode strips 321 and the plurality of second electrode strips 322 on the first base substrate include no gaps (that is, it is seamless). In this way, it is ensured that the dimming panel does not leak light in the non-transparent state, and the shape of the electrode strips may not be displayed in the transparent state, so that the dimming panel as a whole has a uniform bright state effect on the entire surface. In addition, the edge portions of the first electrode strip and the second electrode strip may overlap each other, which is beneficial to the implementation of the practical manufacturing process.

For example, the orthographic projection of the first electrode strip 321 on the first base substrate 11 may overlap the orthographic projection of the second electrode strip 322 on the first base substrate 11, as shown in FIG. 10. An overlapping area may be denoted as an area OP. A size of the overlapping area OP in the first direction (the size in the X direction in FIG. 10) may be one-tenth to one-third of the size of the first electrode strip 321 or the second electrode strip 322 in the first direction.

Referring back to FIG. 6, the dimming panel 10 may further include a spacer 4 to support a cell thickness of the dimming panel. For example, the cell thickness of the dimming panel may be in a range of 6-25 μm. Optionally, the spacer 4 may be a spherical spacer or a columnar spacer, and may be made of a transparent material or a non-transparent material. For the practical dye liquid crystal dimming panel, it has a light transmittance of 30-40% in the transparent state. Therefore, even if the spacer 4 is made of a non-transparent material, it will not adversely affect the performance of the dimming panel in the transparent state.

For example, a thickness (that is, a size in a direction perpendicular to the upper surface of the first base substrate 11) of the first insulating layer 13 described above may be about 0.15 μm. Although the first insulating layer 13 is added to the dimming panel provided in the embodiment described above, the two-layer structure of the first electrode has little effect on the cell thickness of the dimming panel because the thickness of the first insulating layer 13 is much smaller than the cell thickness of the dimming panel and even less than a cell thickness fluctuation caused by a practical manufacturing process fluctuation.

Continuing to refer to FIG. 5 and FIG. 6, the dimming panel 10 may further include a frame sealant 5 and a conductive structure 6.

The frame sealant 5 is provided between the first dimming substrate 1 and the second dimming substrate 2 and arranged around the dimming panel 10, so as to close a space between the first dimming substrate 1 and the second dimming substrate 2, thereby avoiding damage to the liquid crystal layer interposed between the two substrates by foreign substances.

The conductive structure 6 is arranged on the first base substrate 11. For example, the conductive structure 6 may be located in the first electrode layer 321L or the second electrode layer 322L. Certainly, the embodiments of the present disclosure are not limited to this, and the conductive structure 6 may also be formed in other layers. For example, the conductive structure 6 may be made of a metallic conductive material.

As described above, the plurality of wires 15 may respectively electrically connect the corresponding electrode strips 121 to the driving circuit 16 such as the IC. Connection points (PADs) are provided in an area where the plurality of wires 15 are electrically connected to the driving circuit 16. This area may also be referred to as a binding area, such as a binding area 161 shown in FIG. 5 and FIG. 7.

Herein, for ease of description, a side of the dimming panel where the driving circuit 16 and the binding area 161 are located is referred to as a DP (Data Pad) side.

For example, an orthographic projection of the conductive structure 6 on the first base substrate 11 may have an inverted-U shape. Specifically, the orthographic projection of the conductive structure 6 on the first base substrate 11 is located on three sides of the first base substrate 11 other than the DP side (including a side opposite to the DP side as well as left and right sides between the DP side and the side opposite to the DP side).

Referring to FIG. 5 and FIG. 7, the plurality of wires 15 may include a plurality of first wires 151 for electrically connecting the driving circuit 16 to the plurality of electrode strips of the first electrode, and at least one second wire 152 for electrically connecting the driving circuit 16 to the conductive structure 6.

Each first wire 151 electrically connects one of the plurality of first electrode strips 321 and the plurality of second electrode strips 322 to the driving circuit 16, so that each of the plurality of first electrode strips 321 and the plurality of second electrode strips 322 may be independently controlled.

Referring to FIG. 6, conductive particles 52 such as gold balls or copper balls are doped in the frame sealant 5. The conductive particle 52 has one end electrically connected to the conductive structure 6 and the other end electrically connected to the second electrode 22.

That is to say, the control signal output by the driving circuit 16 may be supplied to the second electrode 22 through the at least one second wire 152, the conductive structure 6 and the conductive particles 52, so as to control the second electrode 22.

It should be noted that a partial enlarged view of the area enclosed by a dashed frame shown in FIG. 6 is shown at the lower right of FIG. 6 to clearly show that the conductive particle 52 electrically connects the conductive structure 6 and the second electrode 22. It should be understood that in FIG. 6, in order to clearly show the various structures of the dimming panel according to the embodiments of the present disclosure, the various structures or film layers therein are not drawn according to the size or proportion of the actual product. Therefore, the size and proportion therein should not be understood as a special limitation to the embodiments of the present disclosure.

Figure 11:
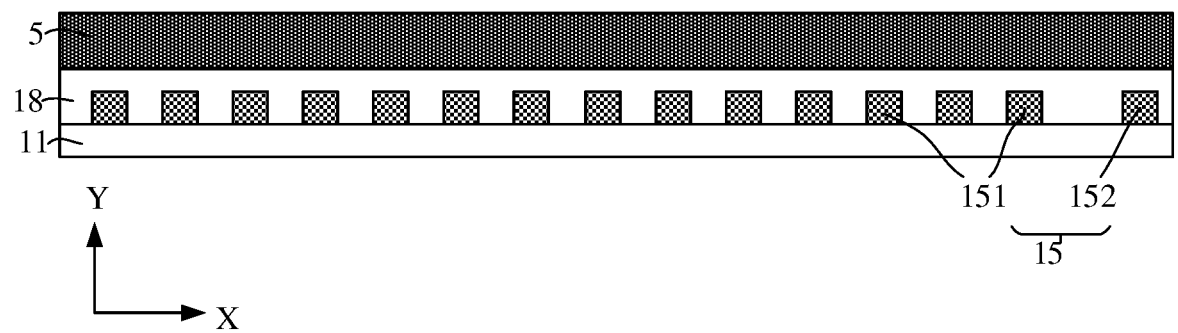
FIG. 11 shows a cross-sectional view of the dimming panel according to the embodiments of the present disclosure taken along line CC' in FIG. 5.

FIG. 11 shows a cross-sectional view of the dimming panel according to the embodiments of the present disclosure taken along line CC' in FIG. 5, which shows a schematic structural diagram of the dimming panel 10 on the DP side. Referring to FIG. 11, the dimming panel 10 may further include a third insulating layer 18 covering the plurality of wires 15. The third insulating layer 18 may be filled between the plurality of wires 15 to avoid a short circuit between the plurality of wires 15. In addition, the third insulating layer 18 is further arranged between the layer where the plurality of wires 15 are located and the layer where the frame sealant 5 is located, so as to prevent the wires 15 from being electrically connected to the second electrode 22 through the conductive particles in the frame sealant 5, thereby avoiding a short circuit between the first electrode and the second electrode.

It should be noted that the third insulating layer 18 may be located in the same layer as or a different layer from the first insulating layer 13 or the second insulating layer 17, which may be set according to practical needs.

Figure 12:
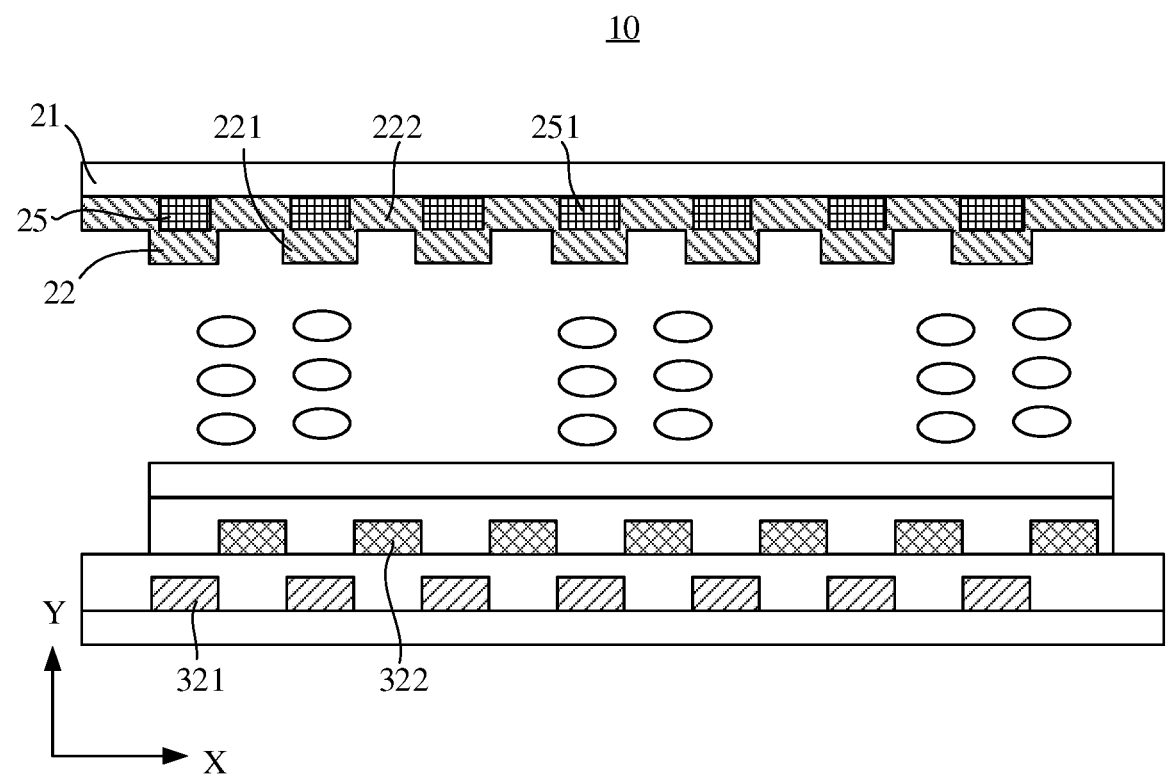
FIG. 12 shows a cross-sectional view of the dimming panel according to other embodiments of the present disclosure taken along line BB' in FIG. 5.

FIG. 12 shows a cross-sectional view of the dimming panel according to other exemplary embodiments of the present disclosure taken along line BB' in FIG. 5. It should be noted that some structures of the embodiments shown in FIG. 12 may be referred to the above description of FIG. 5 to FIG. 11, and the same or similar components or structures are indicated by the same reference numerals. The following description focuses on differences between them. It should also be noted that, in order to clearly show the difference, some structures, such as the alignment layer and the frame sealant, are omitted in FIG. 12.

Referring to FIG. 5, FIG. 6 and FIG. 12, the dimming panel 10 may include a first dimming substrate 1 and a second dimming substrate 2 opposite to the first dimming substrate 1, and a liquid crystal layer 3 interposed between the first dimming substrate 1 and the second dimming substrate 2.

The first dimming substrate 1 may include a first base substrate 11, a first electrode 32, a first insulating layer 13, a second insulating layer 17 and a first alignment layer 14.

The second dimming substrate 2 may include a second base substrate 21, a passivation layer 25, a second electrode 22 and a second alignment layer 24. The passivation layer 25, the second electrode 22 and the second alignment layer 24 are sequentially arranged on the second base substrate 21.

For example, the passivation layer 25, the first insulating layer 13 and the second insulating layer 17 may be made of the same material.

Referring to FIG. 12, the passivation layer 25 includes a plurality of strip-shaped passivation portions 251 arranged in parallel and at intervals in the first direction. The plurality of strip-shaped passivation portions 251 correspond to the plurality of first electrode strips 321 one-to-one. An orthographic projection of the plurality of strip-shaped passivation portions 251 on the first base substrate 11 overlaps (for example, coincides) with the orthographic projection of the plurality of first electrode strips 321 on the first base substrate 11. In other words, the orthographic projection of each strip-shaped passivation portion 251 on the first base substrate 11 overlaps (for example, coincides) with the orthographic projection of the first electrode strip 321 corresponding to the each strip-shaped passivation portion 251 on the first base substrate 11.

In this embodiment, the second electrode 22 of the second dimming substrate 2 may be a planar electrode. That is, the orthographic projection of the second electrode 22 on the second base substrate 21 is formed into a continuous planar pattern. For example, the orthographic projection of the second electrode 22 on the second base substrate 21 is formed as a complete rectangle.

The second electrode 22 is arranged on a side of the passivation layer 25 away from the second base substrate 21. Since the passivation layer 25 includes a plurality of strip-shaped passivation portions 251 arranged at intervals, a part of the second electrode 22 is located in a gap between adjacent strip-shaped passivation portions 251, and the other part of the second electrode 22 covers the strip-shaped passivation portions 251. Referring to FIG. 12, the second electrode 22 may include a plurality of first electrode portions 221 and a plurality of second electrode portions 222 alternately arranged in the first direction. An orthographic projection of the first electrode portion 221 on the first base substrate 11 overlaps (for example, coincides) with the orthographic projection of the first electrode strip 321 on the first base substrate 11, and an orthographic projection of the second electrode portion 222 on the first base substrate 11 overlaps (for example, coincides) with the orthographic projection of the second electrode strip 322 on the first base substrate 11.

In the embodiment shown in FIG. 12, the first electrode portion 221 is farther away from the second base substrate 21 than the second electrode portion 222.

For example, a size (that is, a thickness) of each passivation portion 251 in a direction perpendicular to the first base substrate 11 (that is, the Y direction in FIG. 12) is equal to a size (that is, a thickness) of each first electrode strip 321 in the Y direction. For another example, the size (that is, the thickness) of the each passivation portion 251 in the direction perpendicular to the first base substrate 11 (that is, the Y direction in FIG. 12), the size (that is, the thickness) of the each first electrode strip 322 in the Y direction and the size (that is, the thickness) of the each second electrode strip 322 in the Y direction are equal to each other.

In this way, a vertical distance (that is, a distance in the Y direction) between the first electrode portion 221 and the corresponding first electrode strip 321 is equal to a vertical distance (that is, a distance in the Y direction) between the second electrode portion 222 and the corresponding second electrode strip 322. With this arrangement, the distance between the upper and lower electrodes may be consistent, so that the electric field generated is uniform. Therefore, the overall display impression of the dimming panel may be improved.

In this embodiment, by adding the passivation layer on the upper substrate, the distance between the upper and lower electrodes may be consistent. In particular, even if a two-layer structure is adopted in the lower electrode, the distance between the upper and lower electrodes may still be consistent. Therefore, the cell thickness of the dimming panel may be in a range of 3-4 µm, that is, a thin dimming panel may be manufactured. In addition, the passivation layer may be fabricated by using a mask for fabricating the first electrode strips, that is, the dimming panel may be thinned without increasing masks, which is beneficial to reduce the manufacturing cost.

Figure 13:
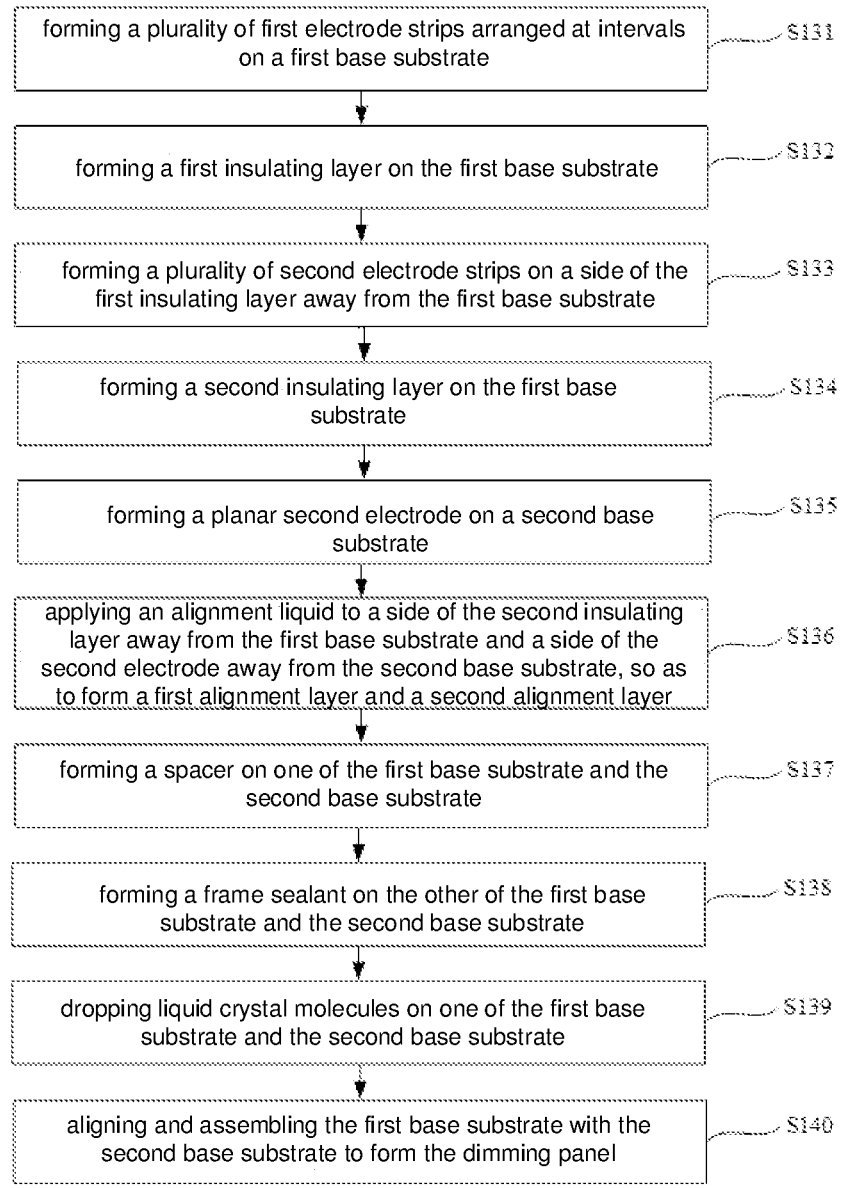
FIG. 13 shows a flowchart of a method of manufacturing a dimming panel according to some exemplary embodiments of the present disclosure.

FIG. 13 shows a flowchart of a method of manufacturing a dimming panel according to some exemplary embodiments of the present disclosure. Referring to FIG. 5, FIG. 6 and FIG. 13, the method may be performed according to following steps.

In step S131, a plurality of first electrode strips 321 arranged at intervals are formed on the first base substrate 11. For example, a first mask may be used to form the plurality of first electrode strips 321 arranged at intervals on the first base substrate 11.

In step S132, a first insulating layer 13 is formed on the first base substrate 11. The first insulating layer 13 may be filled in the gaps between the plurality of first electrode strips 321 and cover the plurality of first electrode strips 321.

In step S133, a plurality of second electrode strips 322 are formed on the side of the first insulating layer 13 away from the first base substrate 11. For example, a second mask may be used to form the plurality of second electrode strips 322 on the side of the first insulating layer 13 away from the first base substrate 11. The plurality of second electrode strips 322 and the plurality of first electrode strips 321 are formed to have a complementary relationship, so that the orthographic projection of the combination of the plurality of second electrode strips 322 and the plurality of first electrode strips 321 on the first base substrate 11 is a complete planar pattern.

In step S134, a second insulating layer 17 is formed on the first base substrate 11. The second insulating layer 17 may be filled in the gaps between the plurality of second electrode strips 322 and cover the plurality of second electrode strips 322.

In step S135, a planar second electrode 22 is formed on a second base substrate 21.

In step S136, an alignment liquid (for example, PI liquid) is applied to a side of the second insulating layer 17 away from the first base substrate 11 and a side of the second electrode 22 away from the second base substrate 21, so as to form a first alignment layer 14 and a second alignment layer 24.

In step S137, a spacer is formed on one of the first base substrate 11 and the second base substrate 21. For example, a spherical spacer may be sprayed on a side of the second alignment layer 24 away from the second base substrate 21.

In step S138, a frame sealant is formed on the other of the first base substrate 11 and the second base substrate 21. For example, a sealant material doped with conductive particles may be applied to the side of the first alignment layer 14 away from the first base substrate 11, and then cured to form the frame sealant.

In step S139, liquid crystal molecules (for example, dye liquid crystal molecules) are dropped on one of the first base substrate 11 and the second base substrate 21.

In step S140, the first base substrate 11 and the second base substrate 21 are box-aligned to form the dimming panel 10.

It should be noted that according to some embodiments of the present disclosure, some steps in the method described above may be executed separately or in combination, and may be executed in parallel or sequentially, and are not limited to the specific operation sequence shown in FIG. 13.

It should be noted that in the exemplary embodiments of the present disclosure described above, the dimming panel is illustrated by way of example to describe the general inventive concept of the present disclosure in detail. However, the embodiments of the present disclosure are not limited thereto. The general inventive concept of the present disclosure may also be applied to a TN (Twisted Nematic) type display device, such as a passively driven TN type display device. In other words, the embodiments of the present disclosure further provide a TN-type display device, such as a passively driven TN-type display device, the specific structure of which may be referred to FIG. 1 to FIG. 12 and the above description. It should also be understood that, in addition to the structures shown in FIG. 1 to FIG. 12, the TN-type display device may further include structures necessary for the TN-type display device. For these structures, reference may be made to the structures of the TN-type display device in the related art, which will not be repeated here.

Although some embodiments according to the general inventive concept of the present disclosure have been illustrated and described, it should be understood by those ordinary skilled in the art that these embodiments may be changed without departing from the principle and spirit of the general inventive concept of the present disclosure. The scope of the present disclosure is defined by the claims and their equivalents.

What is claimed is:

1. A dimming panel, comprising:
a first base substrate and a second base substrate opposite to the first base substrate;
a first electrode on the first base substrate;
a second electrode on the second base substrate;
a liquid crystal layer between the first base substrate and the second base substrate; and
a passivation layer on the second base substrate,
wherein the first electrode comprises a plurality of first electrode strips arranged at intervals in a first direction and a plurality of second electrode strips arranged at intervals in the first direction, the plurality of first electrode strips are located in a first electrode layer, the plurality of second electrode strips are located in a second electrode layer that is located on a side of the first electrode layer away from the first base substrate, and an orthographic projection of a combination of the plurality of first electrode strips and the plurality of second electrode strips on the first base substrate is an integrated plane without gaps;
wherein the second electrode is located on a side of the passivation layer away from the second base substrate, and
wherein the passivation layer comprises a plurality of strip-shaped passivation portions arranged at intervals in the first direction, and an orthographic projection of the plurality of strip-shaped passivation portions on the first base substrate overlaps an orthographic projection of the plurality of first electrode strips on the first base substrate.

2. The dimming panel of claim 1, wherein the first electrode layer further comprises a plurality of first gaps, the plurality of first electrode strips and the plurality of first gaps are alternately arranged in the first direction, and orthographic projections of the plurality of second electrode strips on the first base substrate cover orthographic projections of the plurality of first gaps on the first base substrate, respectively; and/or
the second electrode layer further comprises a plurality of second gaps, the plurality of second electrode strips and the plurality of second gaps are alternately arranged in the first direction, and orthographic projections of the plurality of first electrode strips on the first base substrate cover orthographic projections of the plurality of second gaps on the first base substrate, respectively.

3. The dimming panel of claim 2, wherein areas of the orthographic projections of the plurality of second electrode strips on the first base substrate are equal to areas of the orthographic projections of the plurality of first gaps on the first base substrate, respectively; and/or
areas of the orthographic projections of the plurality of first electrode strips on the first base substrate are equal to areas of the orthographic projections of the plurality of second gaps on the first base substrate, respectively.

4. The dimming panel of claim 2, wherein areas of the orthographic projections of the plurality of second electrode strips on the first base substrate are greater than areas of the orthographic projections of the plurality of first gaps on the first base substrate, respectively; and/or
areas of the orthographic projections of the plurality of first electrode strips on the first base substrate are greater than areas of the orthographic projections of the plurality of second gaps on the first base substrate, respectively.

5. The dimming panel of claim 4, wherein an orthographic projection of an edge portion of the first electrode strip close to the second electrode strip on the first base substrate has an overlapping area with an orthographic projection of an edge portion of the second electrode strip close to the first electrode strip on the first base substrate in the first direction.

6. The dimming panel of claim 5, wherein a size of the overlapping area in the first direction is one-tenth to one-third of a size of one of the first electrode strip and the second electrode strip in the first direction.

7. The dimming panel of claim 1, further comprising:
a frame sealant between the first base substrate and the second base substrate; and
a conductive structure on the first base substrate,
wherein the frame sealant is doped with conductive particles, and the conductive structure is electrically connected to the second electrode through the conductive particles.

8. The dimming panel of claim 7, wherein an orthographic projection of the conductive structure on the first base substrate is in an inverted-U shape.

9. The dimming panel of claim 8, further comprising:
a plurality of wires on the first base substrate; and
a driving circuit on the first base substrate,
wherein the plurality of wires comprise a plurality of first wires for electrically connecting the plurality of first electrode strips and the plurality of second electrode strips to the driving circuit.

10. The dimming panel of claim 9, wherein the plurality of wires further comprise at least one second wire for electrically connecting the conductive structure to the driving circuit.

11. The dimming panel of claim 10, further comprising:
a first insulating layer between the first electrode layer and the second electrode layer; and
a second insulating layer on a side of the second electrode layer away from the first base substrate.

12. The dimming panel of claim 11, further comprising a third insulating layer on the first base substrate, wherein the third insulating layer is filled between the plurality of wires and covers the plurality of wires.

13. The dimming panel of claim 8, wherein the second electrode is a planar electrode, and an orthographic projection of the second electrode on the first base substrate covers the orthographic projection of the combination of the plurality of first electrode strips and the plurality of second electrode strips on the first base substrate.

14. The dimming panel of claim 13, wherein the orthographic projection of the combination of the plurality of first electrode strips and the plurality of second electrode strips on the first base substrate does not overlap an orthographic projection of each of the frame sealant and the conductive structure on the first base substrate.

15. The dimming panel of claim 1, wherein the second electrode comprises a plurality of first electrode portions and a plurality of second electrode portions that are alternately arranged in the first direction, an orthographic projection of the plurality of first electrode portions on the first base substrate overlaps the orthographic projection of the plurality of first electrode strips on the first base substrate, and an orthographic projection of the plurality of second electrode portions on the first base substrate overlaps the orthographic projection of the plurality of second electrode strips on the first base substrate.

16. The dimming panel of claim 15, wherein a size of the strip-shaped passivation portion in a direction perpendicular to the first base substrate is equal to a size of the first electrode strip in the direction perpendicular to the first base substrate.

17. A method of manufacturing a dimming panel, comprising:
forming a plurality of first electrode strips arranged at intervals on a first base substrate;
forming a plurality of second electrode strips arranged at intervals, on a side of a layer where the plurality of first electrode strips are located away from the first base substrate;
forming a second electrode on a second base substrate;
forming a liquid crystal layer on one of the first base substrate and the second base substrate; and
aligning and assembling the first base substrate with the second base substrate to form the dimming panel,
wherein an orthographic projection of a combination of the plurality of first electrode strips and the plurality of second electrode strips on the first base substrate is an integrated plane without gaps; and
wherein the dimming panel comprises a passivation layer on the second base substrate, wherein the second electrode is located on a side of a passivation layer away from the second base substrate; and the passivation layer comprises a plurality of strip-shaped passivation portions arranged at intervals in a first direction, and an orthographic projection of the plurality of strip-shaped passivation portions on the first base substrate overlaps an orthographic projection of the plurality of first electrode strips on the first base substrate.

18. The dimming panel of claim 2, further comprising:
a frame sealant between the first base substrate and the second base substrate; and
a conductive structure on the first base substrate,
wherein the frame sealant is doped with conductive particles, and the conductive structure is electrically connected to the second electrode through the conductive particles.

19. The dimming panel of claim 3, further comprising:
a frame sealant between the first base substrate and the second base substrate; and
a conductive structure on the first base substrate,
wherein the frame sealant is doped with conductive particles, and the conductive structure is electrically connected to the second electrode through the conductive particles.

* * * * *